United States Patent [19]
Bishop

[11] 3,944,015
[45] Mar. 16, 1976

[54] RACK AND PINION STEERING GEAR

[76] Inventor: Arthur E. Bishop, 17 Burton St., Mosman, New South Wales, Australia

[22] Filed: Oct. 26, 1973

[21] Appl. No.: 410,114

[52] U.S. Cl................ 180/79.2 R; 74/498; 280/96
[51] Int. Cl.² .................... B62D 3/12; B62D 5/10
[58] Field of Search.................. 180/79.2 R, 79.2 F; 280/96; 74/498

[56] References Cited
UNITED STATES PATENTS

| | | | |
|---|---|---|---|
| 1,123,042 | 12/1914 | Waite.................................. | 280/96 |
| 2,973,658 | 3/1961 | Bishop........................... | 180/79.2 X |
| 3,186,507 | 6/1965 | Dangauthier..................... | 280/96 X |
| 3,605,933 | 9/1971 | Millard................................. | 280/96 |
| 3,605,934 | 9/1971 | Millard................................. | 280/96 |

FOREIGN PATENTS OR APPLICATIONS

| | | | |
|---|---|---|---|
| 852,544 | 10/1960 | United Kingdom.................. | 280/96 |
| 911,364 | 11/1962 | United Kingdom.................. | 280/96 |

*Primary Examiner*—Robert R. Song
*Assistant Examiner*—John A. Pekar
*Attorney, Agent, or Firm*—Hill, Gross, Simpson, Van Santen, Steadman, Chiara & Simpson

[57] ABSTRACT

A compact rack and pinion steering gear mechanism, incorporating an overlapping or "piggy-back" configuration. A variable ratio embodiment incorporates a substantial ratio change with minimum complication of structure by providing relative lateral movement between the rack and pinion simultaneously with longitudinal movement of the rack.

9 Claims, 8 Drawing Figures

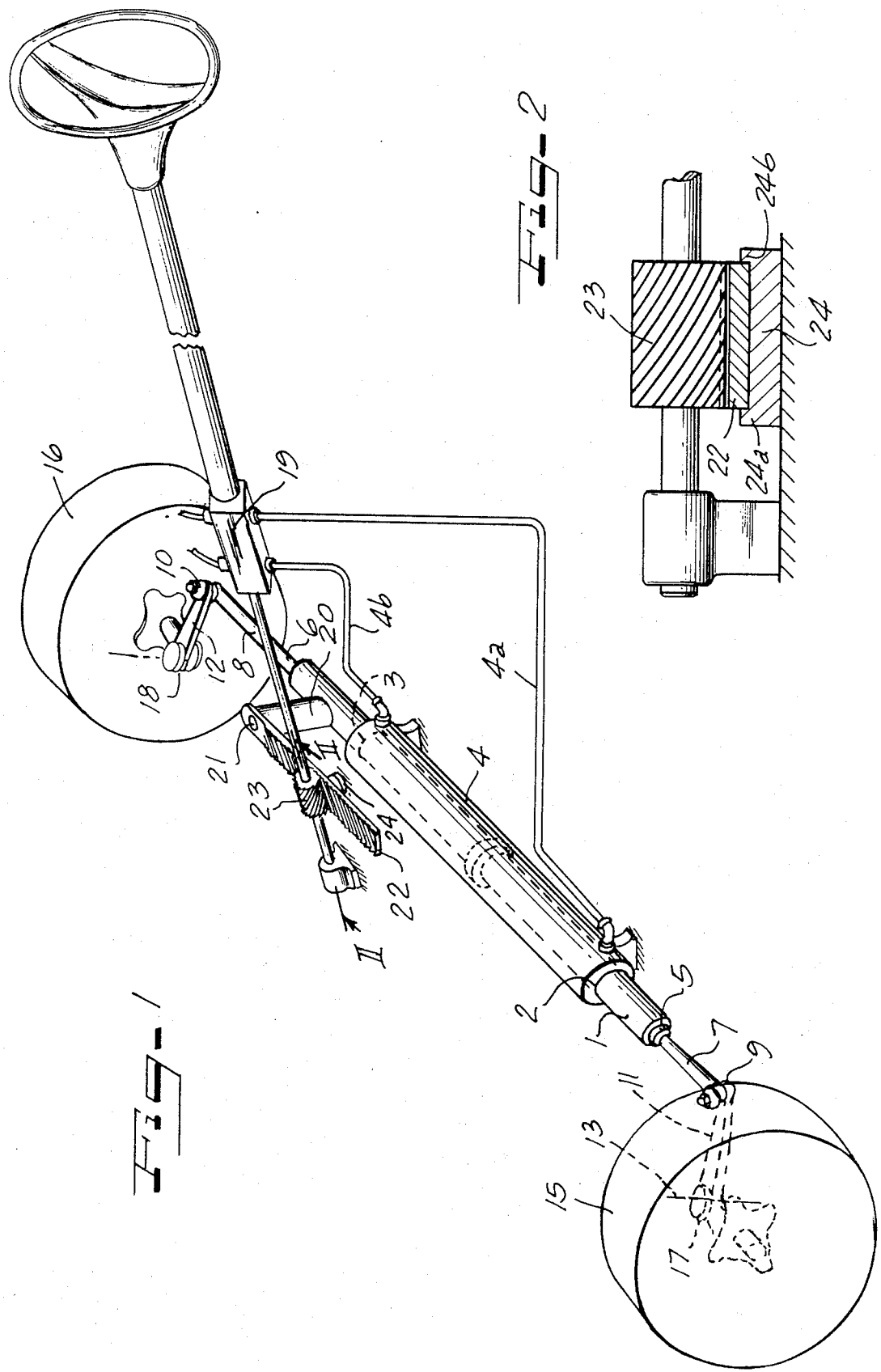

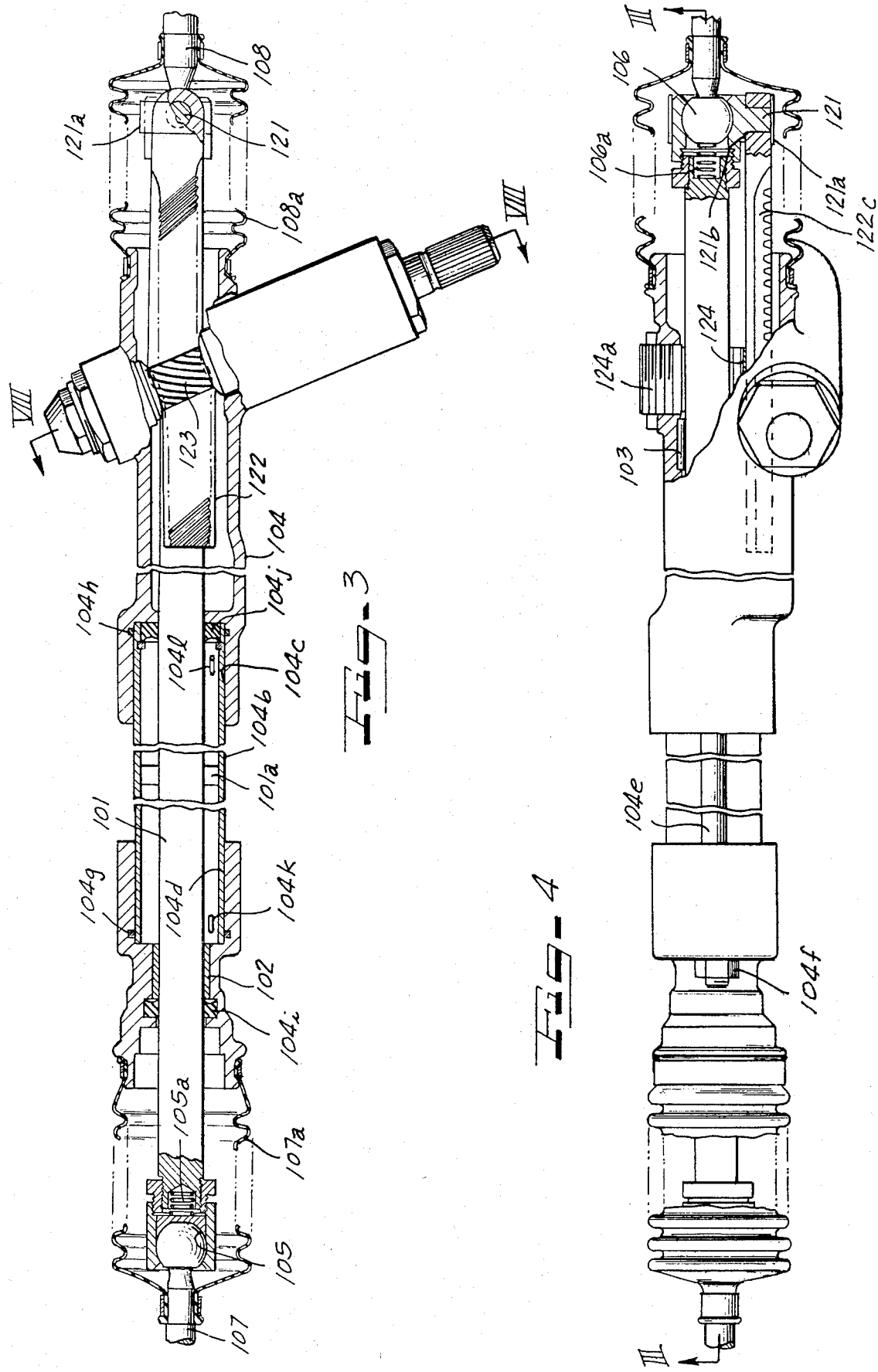

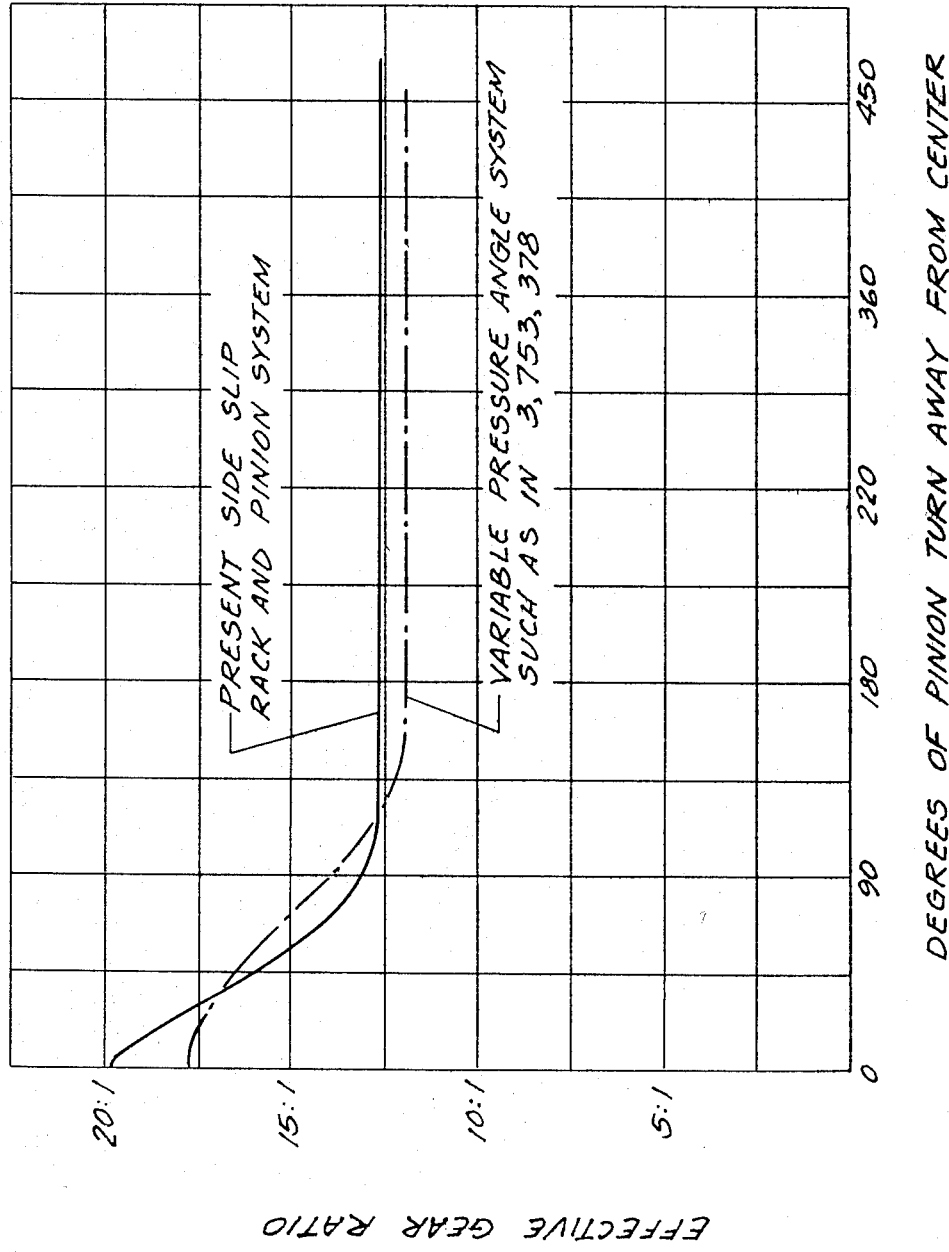

RACK AND PINION STEERING GEAR

This invention relates to improvements in rack and pinion steering gears for automotive vehicles, whether of the type arranged transversely and having a tie rod extending from each end of the gear to actuate a steered wheel, or longitudinally in the vehicle and having a tie rod which actuates one steered wheel directly. In both cases a pinion rotated by the steering wheel engages a rack and thereby slides a rod axially in bearings. The former arrangement is the most widely used in passenger cars.

To date, the arrangement generally used is for the rod to have the rack teeth cut therein, an arrangement which has many attendant disadvantages which are avoided by the subject invention. For example, the combined rack-rod extends from one or both ends of the steering gear, where it is ball-jointed to tie rods, which may at times lie at a considerable angle to the axis thereof during suspension travel and/or turning of the steered wheels. These forces can be very large, and also at a considerable angle, tending to cause the rack-rod to move sideways or up and down in its bearings.

When the rack teeth are cut in the rod, it is also a requirement that the rack engage the pinion in a slack-free manner at all points of travel of the rack-rod and to this end it is general practice that the bearing supporting the rack end of the rod be spring-loaded towards the pinion. It is the yielding of this spring and associated development of slack between the pinion and rack as when tie rod forces are high and angles longer that causes the undesirable "rack rattle" characteristic of this type of steering gear. The undesirability of having a spring-loaded or "floating" rack-rod is even greater in power steered cars, where it is general practice to incorporate the power cylinder between the rod bearings, so that the rod now becomes a combined piston rod and rack. The seals of the cylinder must accommodate the movement of the rack associated with its spring-loaded support without leaking, and this poses many problems. A further disadvantage of cutting the rack directly into the rod is, of course, that the strength of the rod is thereby considerably reduced, and must, in consequence, be made larger than if not cut. Similarly, as the piston rod-rack normally projects into the wheel arc area protected only by a rubber boot, it would be desirable that it be surface-hardened and chrome-plated. This could readily be done if the rod were plain, but is impractical if the teeth are cut therein.

A still further complication occurs in some power steered cars in that there is insufficient width to accommodate both the rack and the piston serially along the axis of the rod together with the necessary clearances, after allowance has been made for the length of the tie rods.

In accordance with the present invention, the several disadvantages noted are overcome by separating the rack from the rod and pivotally connecting it thereto in a manner which allows for the side movements of the rod under load, as well as movement of the rack as a result of mesh adjustment between the pinion and rack, each without affecting the other.

The structure of the present invention also allows parallel positioning of the rack with respect to the cylinder in power-steered cars to overcome the length problem and sealing problem referred to above. Also, in power steered cars, the smaller rod, the hardening and the chrome plating made practicable by the absence of teeth reduces operating friction. High friction has accounted for the objectionably poor "feel" in many prior power rack and pinion steering gears.

In a further embodiment of this invention, the pivotal connection between the rack and the rod is utilized in a unique variable ratio system of a characteristic not possible, to my knowledge, with any other rack and pinion system. In my prior U.S. Pat. No. 3,753,378 I describe a variable ratio rack and helical pinion steering system which provides a change of steering ratio near the central position greater than had previously been attainable. However, I have found that to match the handling of certain automobiles, still more ratio change is desirable, and is attainable in accordance with the present invention. In the patent just referred to, the rack has different pressure angles at different points along its length. Through center, where it is desirable to have the ratio numerically high, the pinion and rack teeth are relatively conventional, at about 20° pressure angle, and of a relatively small pitch. To give the low ratio in the regions of travel away from center, the pressure angle is increased to about 50°, which increases the pitch of the teeth by about one-half. A very small diameter pinion is employed. According to the present invention, the rack teeth are all of relatively conventional pressure angle and of uniform pitch along the length of the rack. The pinion is proportioned according to the desired ratio in the low ratio region, and hence, may be considerably larger in diameter (all things being equal) than its counterpart pinion made according to the earlier patent. This is an important advantage in safety.

In the central portion of the rack where the ratio is required to be numerically high, the ratio is raised by causing relative motion between the rack and pinion generally transverse to the axis of the rack. In a preferred embodiment the rack is caused to side-slip along the helical pinion thereby reducing the effective tooth-to-tooth pitch. This side-slipping motion of the rack is accommodated by the pivotal connection of the rack to the rod, and is positively achieved by cam faces on the sides of the rack engaging suitably placed guides.

It is, accordingly, an object of the invention to provide an improved, compact, efficient, rack and pinion power steering system.

It is another object of the invention to provide a variable ratio rack and pinion power steering system capable of providing substantial ratio change through the central, down-the-road range.

Still other objects and features will become apparent from a consideration of the attached specification and drawings wherein:

FIG. 1 is a schematic, generally isometric, view of a steering system of the present invention;

FIG. 2 is a cross-sectional view taken along line II—II of FIG. 1;

FIG. 3 is a partially broken away plan view of a modified form of the rack and pinion power steering system of the present invention;

FIG. 4 is a side-elevational view of the structure shown in FIG. 3;

FIG. 7 is a chart showing a ratio curve provided by the structure illustrated in FIG. 3;

DETAILED DESCRIPTION

Figure 5:
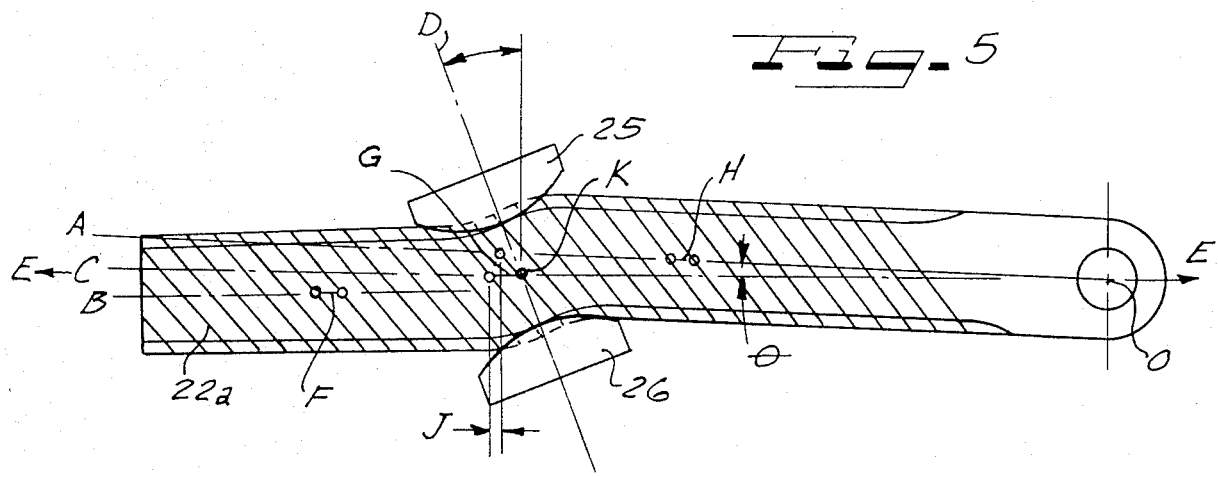
FIG. 5 is a diagrammatic plan view of a rack arrangement illustrating the ratio changing aspects of the present invention.

FIG. 1 shows, schematically, an arrangement of a constant ratio rack and pinion steering gear according to the invention in which a rod 1 reciprocates axially in bearings 2, 3, housed at opposite ends of power cylinder 4, and is connected through ball joints 5,6, to tie rods 7,8, which, in turn, are connected through respective ball joints 9,10, to steering arms 11,12, thus causing dirigible wheels 15,16, to steer about pivots 17,18. Power is applied to the cylinder 4 via conduits 4a,4b, and conventional power steering valve 19 directing fluid under pressure from a conventional source of fluid under pressure (not shown).

Rod 1 carries a rigid spur or abutment 20 and pivot 21 for the transmission of steered movements imparted to the rack 22 by helical pinion 23.

Pad 24 supports the rack with respect to forces tending to separate the rack from the pinion. Side guides 24a, 24b restrain the rack from side motion due to the helical teeth, as shown in FIG. 2. In this arrangement, in which the rack and pinion gear ratio is constant, the overlapping of the power cylinder with the rack, accomplished by the arrangement shown, provides a much shorter structure than heretofore possible.

FIG. 3 shows a modification of the arrangement shown in FIG. 1 to provide variable ratio. It will be seen that the rack 22a is no longer straight but has a "kink" or "dog's leg" shape at about its mid-travel position. Pad 24 supports the rack as before, but without guides 24a, 24b, and the side restraint is now provided by rollers 25,26 each bearing on one side of the kinked rack.

Figure 6:
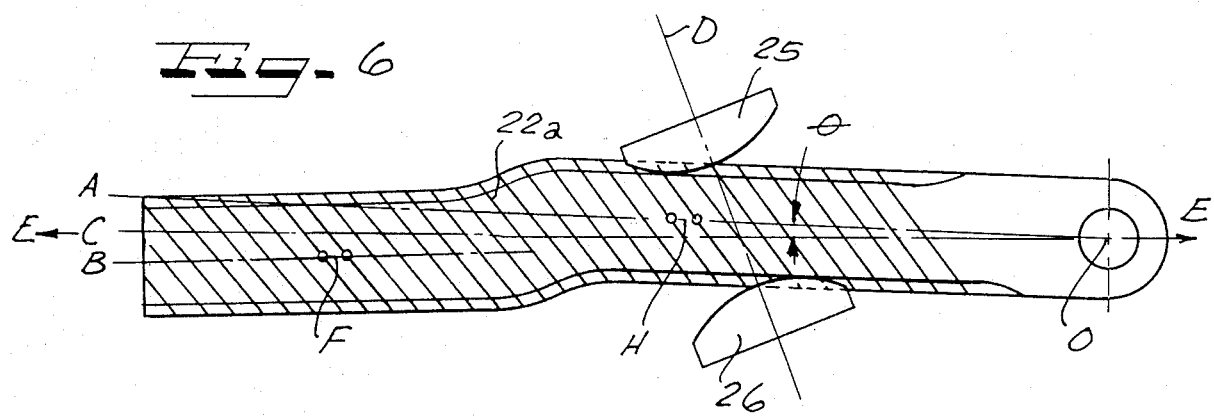
FIG. 6 is a plan view of the arrangement shown in FIG. 5 with the component parts shown in a different position.

FIGS. 5 and 6 serve to illustrate the way in which the side-shifting of the rack reduces the effective tooth-to-tooth pitch. They illustrate, respectively, the engagement in on-center condition and in right turn condition at a point where the ratio is constant.

In FIGS. 5 and 6 a simplified layout is shown. There line O–A represents the center-line of the right turn, constant-ratio section of the rack, line O–B is the center-line of the left turn constant ratio section of the rack, and line O–C is the center-line of engagement on-center. The pinion center-line D–D has been shown here as at an angle of about 68° to the direction of travel E–E of the rod, but it may be at some other angle, such as 90°, if desired, or required to fit a particular vehicle, and that change would not affect the principle of operation now described. In the specific embodiment of FIGS. 3, 4 and 8, the angle is illustrated as 68°.

Assuming that the pinion has six teeth and the pitch of the rack from tooth-to-tooth is the same in each section (for example, F=G=H), when the pinion is rotated, for example one-sixth of a revolution, the rack will travel one tooth's distance, indicated at F or H.

However, when the pinion is meshed with the rack on-center, with tooth contact as at K, and the rack pivots through some angle $\theta$ due to the engagement of the cam faces with rollers 25,26 during longitudinal movement of rod 1, the longitudinal rack travel will be J rather than G. By suitably contouring the side of the rack, various amounts of rack side slip, and hence ratio curves, may be achieved. FIG. 7 shows one such curve, where the change of ratio is about 3:2. It is noteworthy that this curve can be achieved with the change of angle $\theta$ of the rack of only about 3 degrees.

It may be more convenient, in practice, to establish a single axis line along which the teeth have a constant pitch, such a line being, for example, C–E. As the center-lines of the straight portions are at a slight angle to this line, typically at about 1-½°, there will be a small difference in "real" pitch amounting to a fraction of 1%, which will have an inconsequential effect on the ratio properties.

Generation of the rack may be carried out in a true facsimile manner. That is, a cutter may be used of the same cross-sectional profile as a section of the pinion and reciprocated in a gear generating machine in a helical manner so as to sweep out in space the envelope of the pinion. The rack may then be caused to be moved across the face of such reciprocating cutter with a motion imparted to it exactly as desired when installed and operating in the steering gear. It then follows that the movement of the pivot points would simulate the variable rate of travel which occurs in the steering gear if the cutter was rotated incrementally at a constant rate.

A second, somewhat simpler, manner of fabrication is to move the rack along a line, for example E–E, in a constant and uniform geared relationship with rotation of the same helical cutter which is caused to reciprocate, for example, along the line D–D of FIG. 4, and merely cause the pivot point O of the rack to rise and fall transverse to the line E–E which imparts the necessary changing angle of the teeth as cutting by the cutters occurs through the center portion of the rack. With this arrangement, no variable rate of cutter speed or rack reciprocation past the cutter need be introduced in the generating machine.

It will, of course, be clear to those skilled in the art of gear generation that the helical pinion counterpart cutter may, alternatively, be larger in diameter than the pinion ultimately to be used in the steering device. Compensations for the slight inaccuracies introduced by such technique are well known and may be accomplished conventionally.

Figure 8:
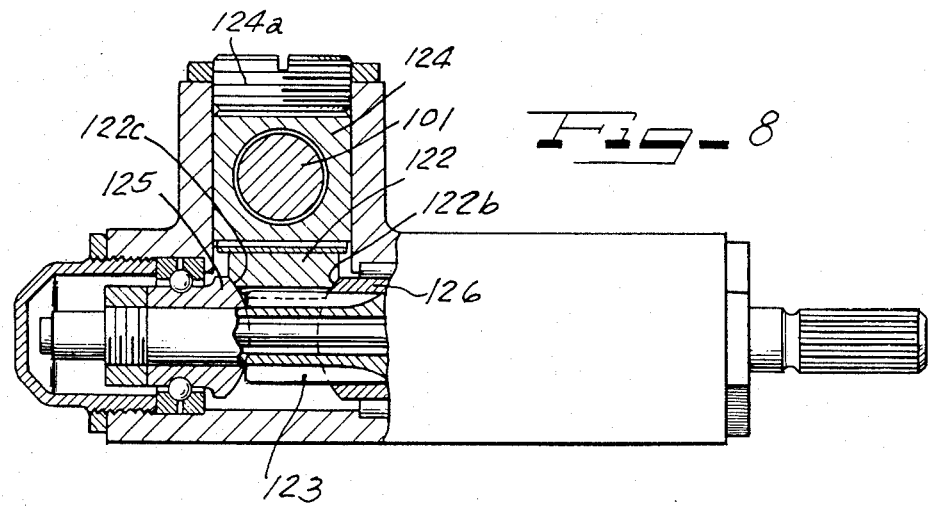
FIG. 8 is a cross-sectional view taken along line VI—VI of FIG. 3.

FIGS. 3, 4 and 8 show an improved arrangement for controlling the side shifting of the rack. Here the rack is shown in cross-section as having beveled faces 122b, 122c comprising cam surfaces. Control of the side-shifting motion is through these faces by engagement with mating guide rollers 125,126 mounted on each side of the pinion. In practice, it is desirable that these washers be segmental-spherical in shape, as shown, so as to insure continuous contact with the cam bevels. I have found that elimination of all clearance or play in constraining the rack sideways, though desirable, may not be critical because, the angle between the rack teeth and direction of side shift is close to the friction angle and therefore would not automatically result in slack.

An improved understanding of the compactness of rack and pinion power steering provided by the "piggyback" or overlapping configuration can be had from a consideration of the details of FIGS. 3, 4 and 8. There, the rod 101 carries fixed thereto, piston 101a and is supported for reciprocal movement in bearings 102 and 103 rigidly mounted via the cylinder 104 to the vehicle frame 104a by bolting, welding, or other conventional means. The cylinder 104 is constructed of a tube 104b seated in bores 104c, 104d and rigidly retained there by means of cap screws 104e and retaining nuts 104f on opposite sides of the cylinder. O-ring seals 104g and 104h prevent leakage around the outside of the tube 104b while seals 104i and 104j prevent leakage along the rod 101. Fluid under steering pressure may be introduced, selectively, at openings 104k, 104l by conventional power steering conduits leading to a conventional power steering valve and pressure source.

The rod 101 carries in an articulated fashion, links 107, 108 via ball joints 105, 106 which may take any convenient form but which are preferably spring-loaded by springs 105a, 106a. A dust boot 107a, 108a is provided to keep dirt out of the system.

The rack 122 is pivotally carried by pivot 121 and is supported by pad 124. In the embodiment shown in FIGS. 3 and 4, the pad 124 passes the rod 101 loosely therethrough and may be adjusted by way of threaded plug 124a to provide the desired snugness. Spring clip 121a maintains rack 122 firmly against the abutment shoulder 121b. Reciprocation of the rack 122 is accomplished by way of helical pinion 123. To provide variable ratio, the rack 122 is kinked at its mid-point, as above described, to provide for side-slipping as the pinion rotates the rack through the on-center condition as shown in FIG. 3. The side-slipping, as above discussed, provides a controlled reduced longitudinal travel of the rack with a given degree of pinion rotation through the central, kinked, rack portion. I have found that the spherical guides 25,26, coupled with the beveled faces 122b, 122c, provide an effective snug contact with the rack throughout its range of travel.

Those skilled in the automotive art will appreciate that while the illustrated embodiments show right-hand drive vehicle systems such as employed in Australia, Japan and Great Britain, the end-for-end reversal of parts to provide for use in the typical left-hand drive system employed in the United States is easily made. Similarly, parts may be readily revised to permit use of the rack and pinion components forward of the dirigible wheels, if desired.

Further embodiments may be constructed within the concepts of the invention. For example, the helical pinion may be axially slid along its shaft rather than provide the rack with transverse, or side slip movement. Such axial pinion movement may be accomplished, for example, by pinion cam guide surfaces carried by a uniformly gear toothed rack 22 and extending toward the pinion shaft and engaging the ends of the pinion. As the thus uniform rack passes under the similarly uniform pinion, the cam guides on the rack will engage the ends of the pinion therebetween to shift it axially causing an effective ratio change in the rack and pinion gearing. Since other variations may readily be made without departing from the novel concepts of my invention, I intend that the scope of my invention be limited solely by that of the hereinafter attached claims.

I claim as my invention:

1. A steering mechanism for movement of a dirigible wheel, comprising a reciprocal rod member supported in fixed bearings and connected to said wheel for pivotal steering movement of the wheel upon reciprocation of the rod, a manually rotatable steering shaft, a pinion gear rotatable with said shaft, a reciprocal rack gear separate from said rod and driven by said pinion gear along an axis generally parallel to said rod and means connecting said rack gear to said rod in a generally longitudinal relation to said rod and for allowing transverse relative movement between said rack and said rod and substantially no longitudinal relative movement therebetween.

2. The structure of claim 1 wherein said pinion gear has helical teeth thereon, and additional means moving said rack gear transversely of the longitudinal axis of said rack gear during at least a portion of the axial travel of said rack to thereby vary the effective ratio of the rack and pinion gearing.

3. The structure of claim 2 wherein said last named means comprises means connected for movement with said rack.

4. The structure of claim 3 wherein said last named means is cooperable with guides fixed axially of said pinion and said steering shaft.

5. The structure set forth in claim 4 wherein said guides comprise segmental spherical elements rotatable about the axis of said pinion gear and contacting said rack gear on opposite beveled sides thereof spaced axially of said pinion.

6. The structure of claim 2 wherein said rack is connected to said rod by a pivot connection permitting transverse movement of said rack about said pivot to permit said transverse rack movement.

7. The structure of claim 1 wherein piston means is rigidly connected to said rod for reciprocal movement in a power cylinder and wherein said rack gear overlaps said cylinder in "piggy-back" relation.

8. The structure set forth in claim 7 wherein said pinion gear has helical teeth thereon, and additional means moving said rack gear transversely of the longitudinal axis of said rack gear during at least a portion of the axial travel of said rack to thereby vary the effective ratio of the rack and pinion gearing.

9. The structure of claim 1 wherein said rack gear is positioned between said rod and said pinion gear.

* * * * *